Oct. 21, 1924.

T. M. BRAGG ET AL 1,512,158

AUTOMOBILE HEADLAMP

Filed Feb. 26, 1924    2 Sheets-Sheet 1

Inventors
Thomas Milton Bragg
and
John Frederick Howarth
By
Pennie, Davis, Marvin & Edmonds
Attorneys

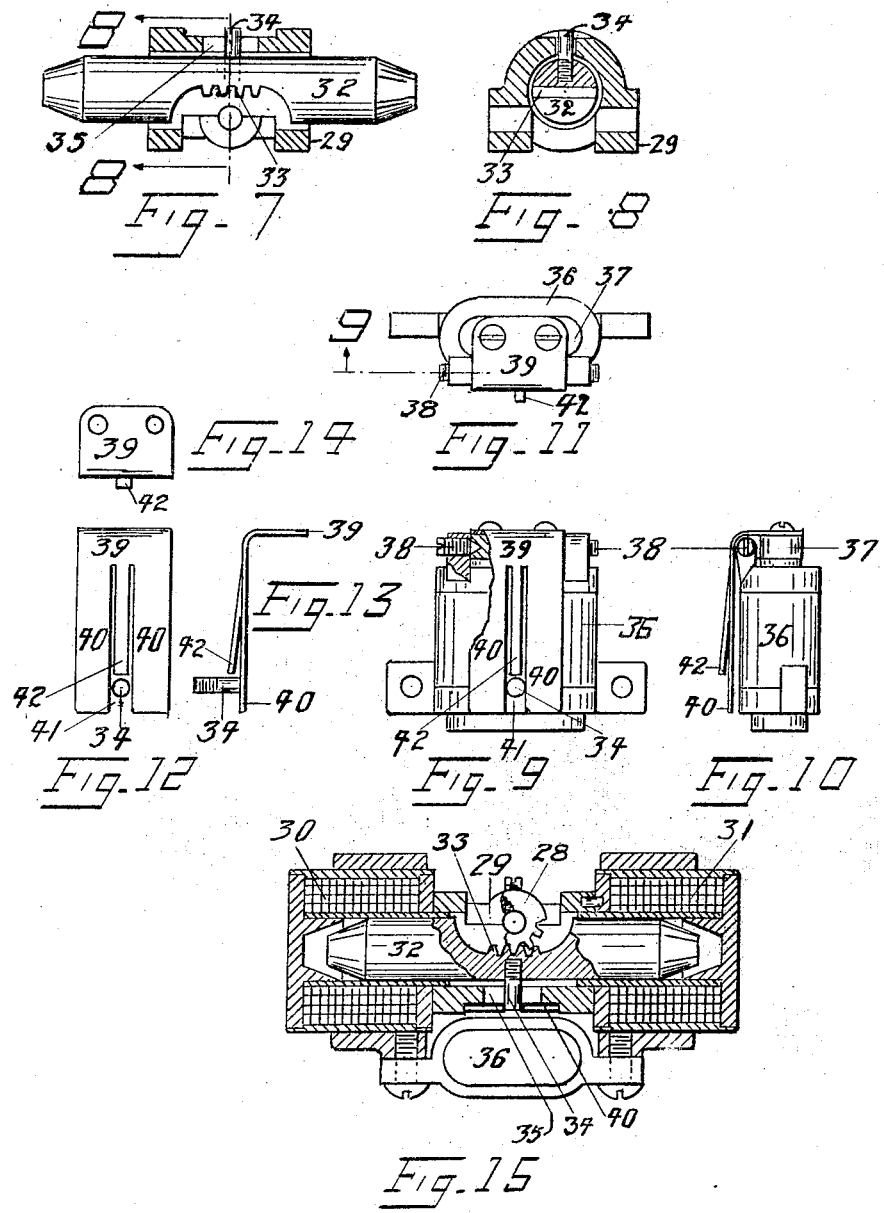

Patented Oct. 21, 1924.

1,512,158

UNITED STATES PATENT OFFICE.

THOMAS MILTON BRAGG, OF MUNGERIBAR, AND JOHN FREDERICK HOWARTH, OF MARRICKVILLE, NEAR SYDNEY, NEW SOUTH WALES, AUSTRALIA.

AUTOMOBILE HEADLAMP.

Application filed February 26, 1924. Serial No. 695,188.

*To all whom it may concern:*

Be it known that we, THOMAS MILTON BRAGG and JOHN FREDERICK HOWARTH, subjects of the King of Great Britain and Ireland, residing, respectively, at Mungeribar, in the county of Narromine, State of New South Wales, Australia, and 105 Fraser Street, Marrickville, near Sydney, in the county of Cumberland, State of New South Wales, Australia, have invented certain new and useful Improvements in Automobile Headlamps, of which the following is a specification.

The object of this invention is to provide an effective means whereby the driver of an automobile will be enabled to vary the adjustment of the head lamps at will, so as to minimize glare effect when approaching or passing other traffic, or when the car is standing. It is well recognized that the "dimming" of automobile head lamps is an objectionable practice inasmuch as the sudden change in the illumination discommodes the driver of the car, whose eyes being habituated to observing the road ahead under full light conditions are incapable of immediately readjusting themselves to take a safe view of the road when the lamps are suddenly dimmed. Whilst, therefore, the dimming of lamps of a vehicle conveniences other drivers, such dimming is a source of danger to the driver of the vehicle itself.

According to the present invention, the full illumination of the head lamps is maintained, but the light source is temporarily de-focussed at the will of the driver so that the glare effect resulting from a concentrated beam is destroyed and the light is diffused. An adequate condition of illumination is thus maintained always on the road immediately ahead of the car. Driving at normal speed can therefore be continued with safety, whilst the drivers of approaching vehicles are not discommoded as they frequently are when a parallel concentrated beam of light is projected from the lamps.

The burner of the lamp in the case of an oil or gas lamp, or the lamp itself in the case of an electric lamp, is mounted in relation to the reflector so that the light source is located normally in the focus of the reflector with the object of producing a more or less parallel concentrated beam adapted for illuminating the road for a substantial distance in advance of the car. This normal adjustment is made variable by providing a means whereby the burner or the lamp, as the case may be, may be moved out of the reflector focus temporarily and so held as long as may be required, so as thereby to bring the source of light to a point more or less distant from the focal centre of the reflector. When the source of light is thus de-focussed, a concentrated beam is no longer produced, diffused illumination only being produced. This illumination is ample for making the road surface immediately in front of the car clear to the driver, and as the light value apparent to the driver is maintained, the driver's vision is not substantially affected, so that he is always able to obtain a safe view of the road ahead.

The preferred arrangement for effecting the de-focussing control is electromagnetic, and the driver is enabled by button or switch control to effect the necessary movement of the lamp burner, or in the case of an electric lamp the necessary movement of the lamp itself.

In the electromagnetic arrangement, two electromagnets in opposed relation and a control magnet are used, with an armature movable obediently to the action of the magnets, but controlled as to the range of its movement by a check mechanism operated by the control magnet. The utility of the control magnet is to check the armature movement at an intermediate point when it is desired by the driver to effect only a partial de-focussing of the lamps. The armature movements are communicated through a short flexible shaft to a pinion which engages a rack on a long socket which carries an electric bulb, or, in the case of an oil lamp or a gas lamp, carries the burner of the lamp by a suitable attachment on its fore end. This socket is slidable in a sleeve which is slidable axially in a guide tube which is fixed to the back of the lamp reflector, and it is armed on one side of it with a toothed rack. The socket projects forwardly through an aperture in the reflector. Normal focussing is effected by means of a screw and buffer spring, the screw head being accessible at or through the back of the lamp casing. The lamp is brought into focus by adjusting the screw, thereby to move the sleeve to bring the socket to the correct position in relation to the focus of the reflector, and the de-focussing is obtained by moving the socket out of this adjusted position forwardly or backwardly.

In the accompanying explanatory drawings:—

Fig. 7 is a view of the armature in position in its housing;

Fig. 8 is a vertical sectional view on line 8—8 of Fig. 7;

Fig. 9 is an elevation, partly in section, of the control magnet;

Fig. 10 is a side elevation of the control magnet;

Fig. 11 is a plan view of the control magnet assembly;

Figs. 12, 13 and 14 are detail views of the check finger shown in relation to the check pin; and Fig. 15 is an inverted view partly in section, of the operating electromagnets on line 4—4 of Fig. 2.

Figure 1:
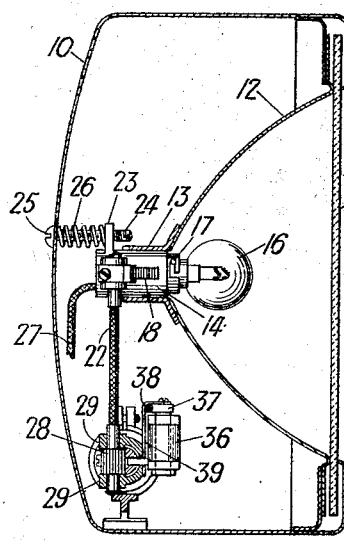
Fig. 1 is a vertical section through a head lamp fitted for electrical illumination.
Figure 2:
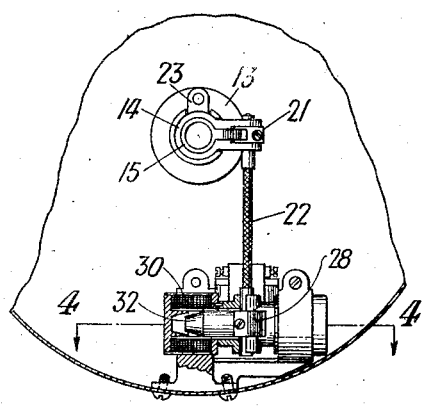
Fig. 2 is a fragmentary transverse sectional elevation behind the reflector.
Figure 4:
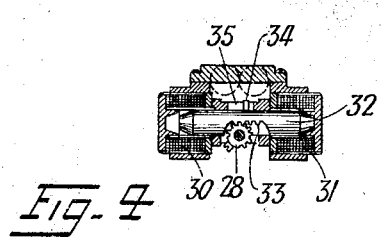
Fig. 4 is a horizontal section on the line 4—4 Fig. 2; showing the electromagnetic means for rocking the flexible shaft by which the lamp socket is moved and for intercepting the movement of the armature at an intermediate point.
Figure 3:
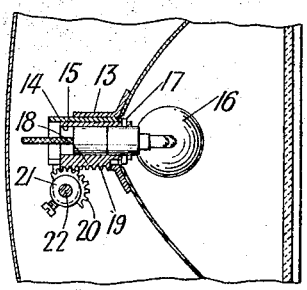
Fig. 3 is a fragmentary sectional view illustrative of the detail construction of the de-focussing mechanism.

10 is the lamp case, 11 the lamp glass or lens, 12 the concave reflector, 13 the guide tube fixed axially at the back of the reflector 12, the reflector being apertured to correspond with it. 14 is a sleeve slidable through the guide tube 13 along the axis of the reflector 12. 15 is a socket slidable in the sleeve 14; the lamp 16 is fixed in this socket by means of the usual bayonet arrangement 17. The sleeve 14 is slotted at one side, and the socket 15 has a rack 18 formed upon it, the slot accommodating this rack so that the rack teeth project through the slot and also through a slot in the guide tube 13. The rack teeth 19 mesh with the teeth 20 of the pinion 21 which is fixed on the top end of a flexible shaft 22. 23 is a lug offset from the sleeve 14. It is tapped to carry an adjusting screw 24 the head 25 of which is exposed at the back of the case 10. 26 is a helical spring in compression abutting against the back of the case 10 and bearing against the lug 23. The spring 26 tends to force the lug 23 and consequently the sleeve 14 forward. The forward position is adjusted by rotating the screw head 25, thereby to bring the filament in the lamp 16 to the focal centre of the reflector 12. 27 are the lead-in wires of the lamp circuit.

The bottom end of the shaft 22 carries a toothed pinion 28 which is housed between bearing cheeks 29 in the magnet frame assembly, which is mounted in the bottom part of the case 10. 30 and 31 are the electromagnet coils; they are wound in opposed relation so that when either one of them is energized the armature 32 is moved accordingly to right or left; this armature 32 has a rack 33 cut in the central portion of it, and with this rack the pinion 28 meshes. On the opposite side of the armature 32 is a guide and check pin 34 which works in a slot 35 in the frame assembly. 36 is a control magnet, and 37 a rocking armature fulcrumed on a pin 38 and carrying a split finger 39; this split finger is a spring plate 40 notched as shown at 41 at its lower part with a curved tongue 42 above the notch 41; this tongue bears against the frame and normally forces the armature 37 to the free position and clears the tongue 42 so that it will not be engaged by the pin 34. When the control magnet 36 is energized to pull down its armature 37 the split finger 40 is forced inward against the resistance of its tongue 42. When subsequent to its operation one or other of the magnets 30 or 31 is energized to reverse the position of the armature 32, the check pin 34 drops into the notch 41 of the split finger and the armature is then held at a middle position.

Thus, when the control magnet 36 is unoperated, operation of the magnet assembly 30 and 31 in either direction has the effect of throwing the armature 32 correspondingly, with the result that the pinion 28, and consequently the shaft 22 and the pinion 21 are rotated. During the movement in one direction this rotation has the effect of moving the socket 15 to bring the lamp 16 to the adjusted focal position, which is regulated by means of the screw 24. Movement in the reverse direction has the effect of sliding the socket 15 to move the lamp 16 so that the source of illumination will be displaced out of the focal centre of the reflector 12, a full range of movement effecting total de-focussing so that a dispersed illumination only offering practically no glare is then obtained. When it is judged that a partial de-focussing only is necessary to convenience other road users, the control magnet is operated to limit the stroke of the armature 32 and allow the lamp 16 to be moved only sufficiently to destroy the parallelism of the normal beam.

Figure 5:
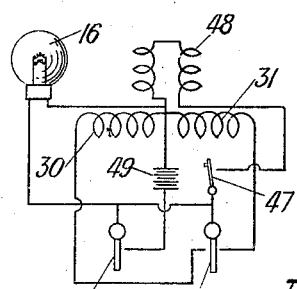
Fig. 5 is a diagrammatic view explanatory of the electric circuit and switch arrangement.
Figure 6:
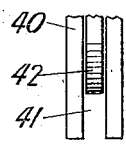
Fig. 6 is a fragmentary view of the check finger on the armature of the control magnet.

The diagrammatic view, Fig. 5, shows a convenient arrangement of the lamp circuit and controls. 45 is a main lighting switch, 46 a reversing switch which controls the coils 30 and 31, 47 a control switch which governs the coil 48 of the magnet 36, and 49 is the lighting battery.

It is to be understood that two head lamps 16, instead of one as shown, may be used in ordinary parallel arrangement.

When the switch 45 is closed, a circuit through the lamp 16 is established. When the switch 46 is thrown to the left hand position another circuit is established through the coil of the magnet 30, which will result in movement of the armature 32 to the left. When the switch 46 is thrown to the right hand position, the coil of the magnet 31 is similarly energized and the armature 30 is moved reversely. When the control switch 47 is closed, another circuit is established through the coil 48 of the magnet 36, the circuit established through the switch 46 in either direction being simultaneously operative.

What we claim as our invention and desire to secure by Letters Patent is:—

1. An automobile head lamp comprising a concave reflector, a fixed guide located axially with the reflector focal point, a sleeve within said guide having transverse pinion bearings, means for adjusting and retaining said sleeve axially with respect to the focal point of the reflector, a toothed lamp socket slidable within said sleeve and adapted to carry a source of light, a pinion engaging the toothed socket, a pinion shaft extending through said pinion and the bearings in said sleeve, a source of light within the focal axis of the reflector, remotely controlled electromagnetic means for moving said lamp socket and source of light with respect to the reflector and a checking device for arresting the movement of the source of light intermediate its limits of travel.

2. An automobile head lamp comprising a concave reflector, a source of light within the reflector, a device for moving said source of light with respect to the reflector, comprising a magnet frame, two opposed electromagnets mounted in a frame and respectively circuited to a battery and a control switch, a toothed armature common to both electromagnets and adapted to slide therein, a pinion engaging the toothed armature, a pinion shaft extending through said pinion and the bearings in the magnet frame, a check-pin in said armature, said pin extending through a slot in the magnet frame, a notched spring plate engaging the check-pin and a control electromagnet attached to the notched spring plate and separately circuited to the battery and control switch to arrest the movement of the source of light intermediate its full throw.

3. An automobile head lamp comprising a concaved reflector, a fixed guide located axially with respect to the reflector focal point, a sleeve within said guide having transverse pinion bearings, means for adjusting and retaining said sleeve axially with respect to the reflector focal point, a toothed lamp socket slidable within said sleeve and adapted to carry a source of light, a pinion engaging the toothed socket, a pinion shaft extending through said pinion and the bearings in said sleeve, a source of light within the focal axis of the reflector, a magnet frame attached to the head lamp and provided with a transverse pinion bearing, two opposed electromagnets concentrically mounted in said frame and respectively circuited to a battery and a control switch, a toothed armature common to both electromagnets and adapted to slide therein, a pinion engaging the toothed armature, a pinion shaft extending through said pinion and the bearings in the magnet frame, a flexible coupling connecting both pinion shafts, a check-pin attached to said armature and extending through a slot in the magnet frame, a notched spring plate engaging the check-pin, and a control electromagnet attached to the magnet frame and operating the notched spring plate and separately circuited to the battery and control switch.

4. An automobile head lamp comprising a reflector, a source of light adjustably mounted in the axis of the reflector, opposed electromagnet coils, a toothed armature movable by either of said coils, a pinion engaging the teeth of the armature and adapted on the energizing of either coil to move the source of light with respect to the reflector and a distant controlled checking device for arresting the movement of the armature intermediate its throw.

5. An automobile head lamp comprising a reflector, a source of light adjustably mounted on the axis of the reflector, opposed electromagnet coils, an armature common to both coils, means operated by the armature to move the source of light to and from the focal point of the reflector, and control means for arresting the movement of the armature and to check it at a point intermediate its full throw.

6. An automobile head lamp comprising a reflector, a source of light adjustably mounted in the axis of the reflector, opposed electromagnet coils, an armature common to both coils, means operated by the armature to move the source of light to and from the focal point of the reflector, and a control magnet for bringing a check into engagement with the armature to arrest its movement at a point intermediate its full throw.

7. An automobile head lamp comprising a reflector, a source of light adjustably mounted in the axis of the reflector, two electromagnet coils in tandem relation, an armature common to both coils, means operated by the armature to move the source of light to and from the focal point of the reflector, a projection on the armature, a control magnet, an armature operable by said control magnet to engage the projection on the first mentioned armature to arrest its movement and to check it at a point intermediate its full throw.

In testimony whereof we have affixed our signatures.

THOMAS MILTON BRAGG.
JOHN FREDERICK HOWARTH.